United States Patent [19]
Baxter et al.

[11] 3,856,330
[45] Dec. 24, 1974

[54] RETRACTABLE KING PIN
[75] Inventors: Bobby G. Baxter; Theodore B. Splitt, both of Warrenton, Mo.
[73] Assignee: The Binkley Company, Warrenton, Mo.
[22] Filed: Aug. 24, 1973
[21] Appl. No.: 391,041

Related U.S. Application Data
[63] Continuation-in-part of Ser. No. 322,640, Jan. 11, 1973.

[52] U.S. Cl............................. 280/433, 280/415 A
[51] Int. Cl............................................. B62d 53/08
[58] Field of Search.... 280/433, 438 R, 439, 415 A, 280/423 R

[56] References Cited
UNITED STATES PATENTS

| | | | |
|---|---|---|---|
| 2,924,464 | 2/1960 | Zajac et al. | 280/421 |
| 2,968,494 | 1/1961 | Klouda | 280/415 A |
| 3,031,206 | 4/1962 | Shinn | 280/433 |
| 3,259,400 | 7/1966 | Tantlinger et al. | 280/423 R |
| 3,647,243 | 3/1972 | Nagy et al. | 280/415 A |

Primary Examiner—M. Henson Wood, Jr.
Assistant Examiner—Michael Mar
Attorney, Agent, or Firm—Rogers, Ezell & Eilers

[57] ABSTRACT

This invention relates to a king pin assembly adapted for mounting to a towing vehicle and which is movable between an operative position and a retracted position, the assembly comprising a pin mounted to the towing vehicle for movement between these positions, spring means for biasing the pin in its operative position, and means for releasably locking the pin in its retracted position.

12 Claims, 6 Drawing Figures

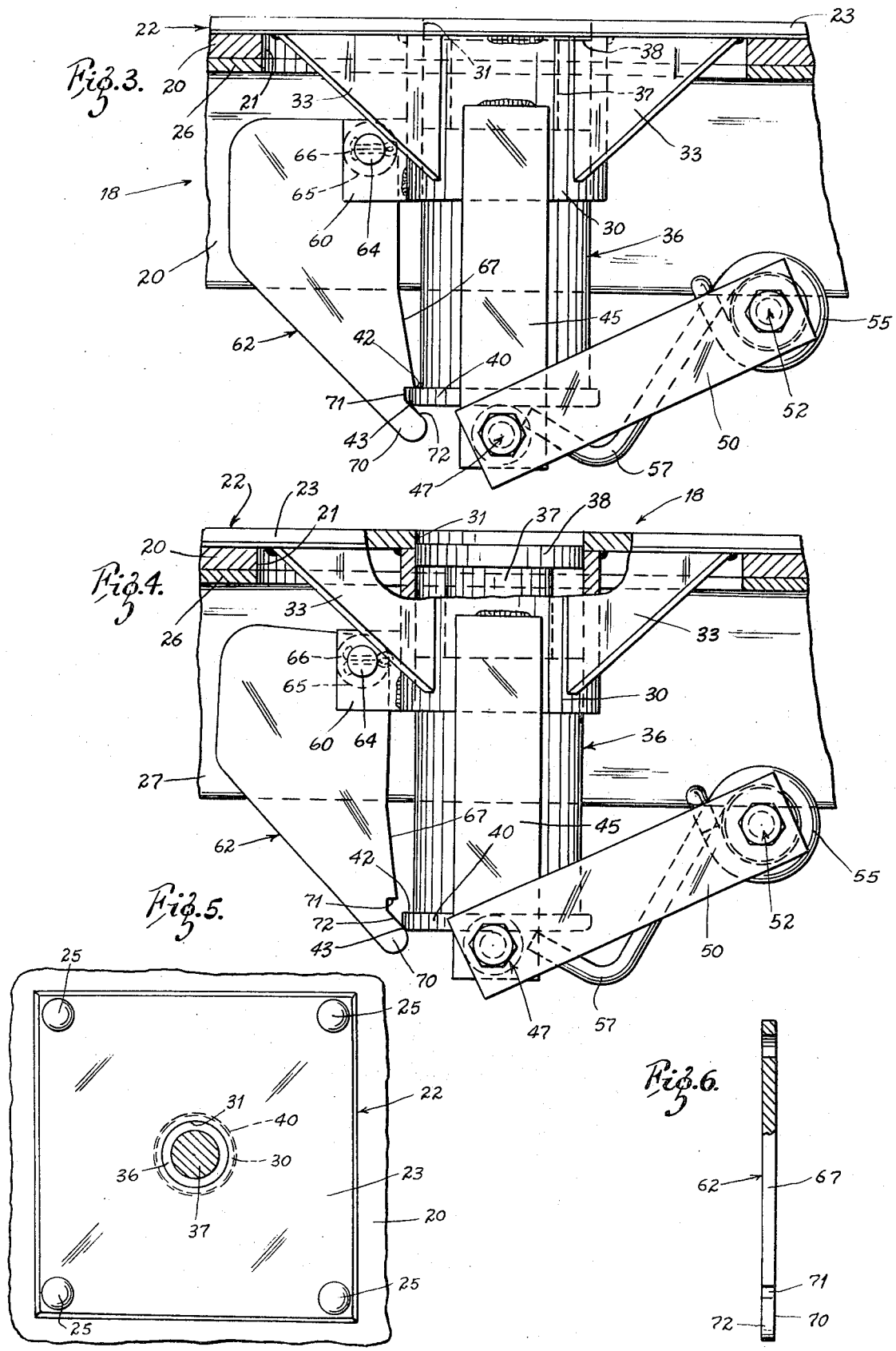

RETRACTABLE KING PIN

SUMMARY OF THE INVENTION:

This application is a continuation-in-part of patent application Ser. No. 322,640, filed Jan. 11, 1973.

This invention relates to a king pin assembly and particularly one that is especially adapted for mounting to a towing vehicle such as a pickup truck without requiring components that interfere with normal use of the truck, and which is movable from an operative to a retracted position in which it leaves the towing vehicle substantially unobstructed. A primary feature of this invention is a quick release mechanism for quickly and easily releasing the king pin from its retracted position and moving it between operative and retracted positions as desired, and to do so without the use of special tools and the like.

Generally, the king pin assembly of this invention comprises a mounting plate for mounting to the bed of a towing vehicle such as a pickup truck. A king pin is mounted in an opening through the mounting plate for movement normal thereto between operative and retracted positions such that in the operative position the top of the king pin extends above the mounting plate for engagement with an appropriate fifth wheel assembly, and in the retracted position the top of the king pin fits substantially flush with the top surface of the mounting plate. Spring means urge the king pin toward its operative position, and there is provided a releasable cam mechanism which acts to latch the king pin in its retracted position and which operates under interaction between a cam surface included thereon and a portion of the king pin to release the king pin from its retracted position upon an impulsive downward depression of the king pin.

Hence, it is a primary object of this invention to provide a retractable king pin assembly which is quickly and easily operable between operative and retracted positions and which leaves the bed of the towing vehicle sustantially unobstructed in the retracted position.

Another object of the invention is to provide such a king pin assembly which is releasable from its retracted position by a quick or impulsive downward depression of the king pin.

These and other objects of the invention will become apparent from the drawing and detailed description to follow.

DESCRIPTION OF THE DRAWINGS:

FIG. 3 is a view similar to FIG. 1 but showing the assembly in its retracted position;

FIG. 4 is a view similar to FIG. 1 but showing the assembly in a depressed position ready for release to its operative position;

FIG. 5 is a view in section on a reduced scale taken generally along the line 5—5 of FIG. 1; and FIG. 6 is a right end elevation view of the cam member shown in FIG. 1.

Figure 1:
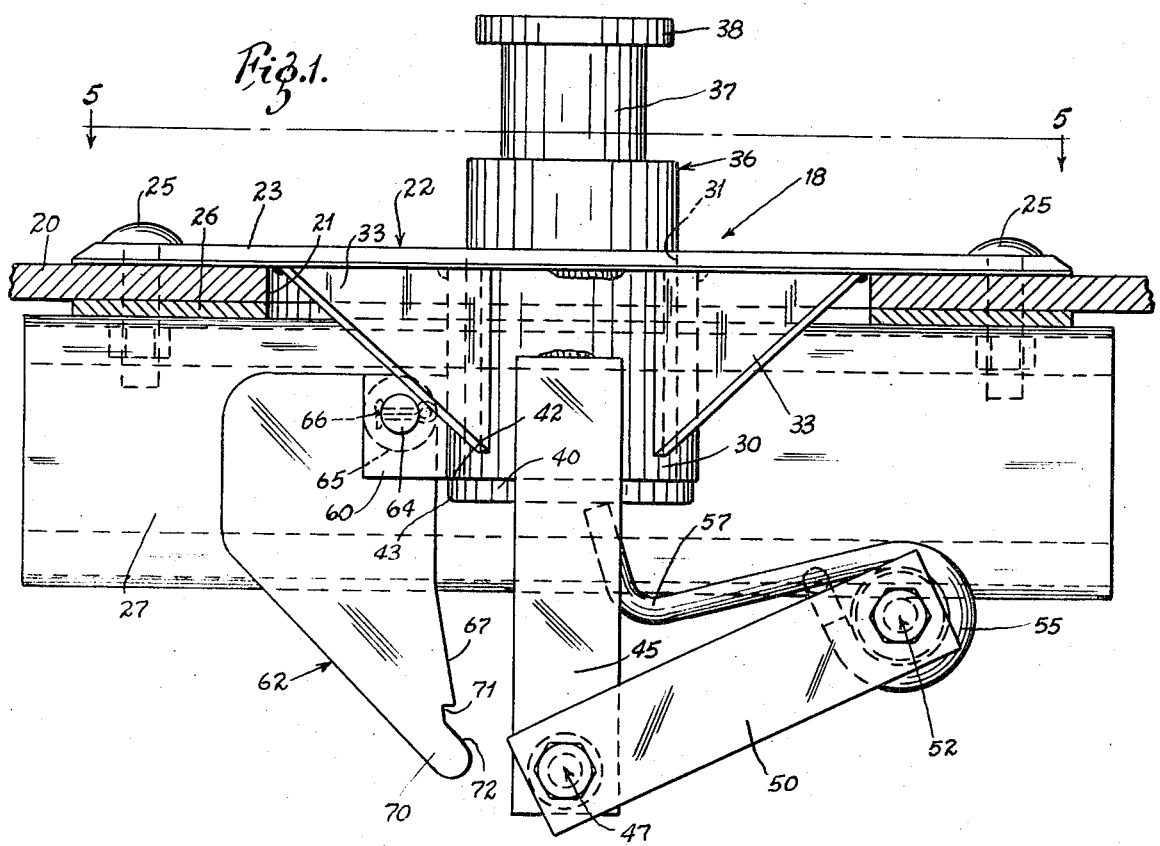
FIG. 1 is a side elevation view of a retractable king pin assembly of this invention shown in its operative position.
Figure 2:
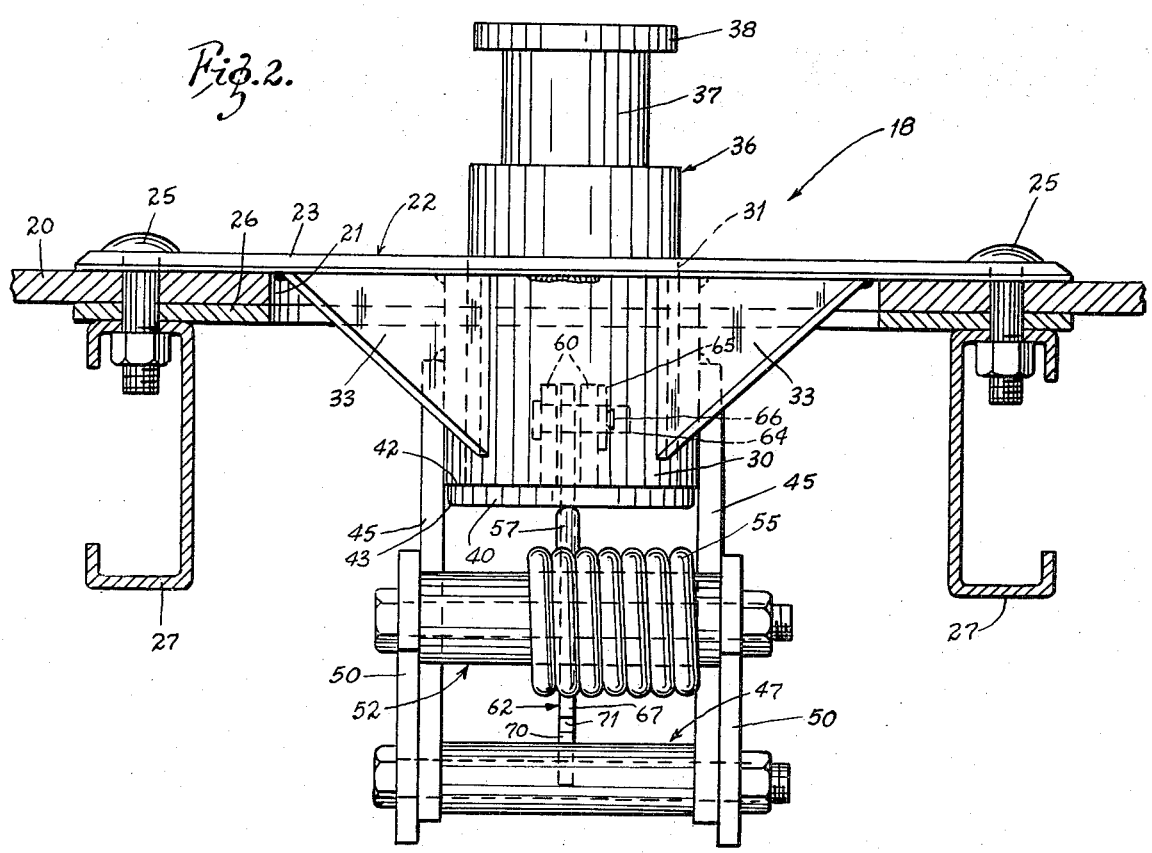
FIG. 2 is a right end elevation view of FIG. 1.

DETAILED DESCRIPTION OF A PREFERRED EMBODIMENT:

Referring to the drawing and initially FIGS. 1 and 2, there is shown a king pin assembly 18 adapted for mounting to the bed 20 of a towing vehicle that may be, for example, a pickup truck. Normally, the bed 20 is of sheet metal. A hole 21 of appropriate size and shape is cut through the bed 20 and a mounting plate assembly 22 is mounted thereover. The mounting plate assembly 22 comprises a mounting plate 23 that is flat and beveled at the edges and which extends out far enough to distribute the load properly and to cover the hole 21. Bolts 25 at its corners extend through holes in the truck bed 20 and are secured below by nuts. If desired, a reinforcing backing plate 26, with or without reinforcing channels 27, may be mounted below the bed 20 to further distribute the load transmitted by the bolts 25 and strengthen the coupling, as it is necessary that the king pin attachment to the vehicle be structurally sufficient.

The mounting plate assembly further includes a cylindrical sleeve 30 secured by welding to the underside of the mounting plate 23 at its center, the mounting plate 23 having a hole 31 therethrough which is the same diameter as the inside diameter of the sleeve 30 and which is axially aligned therewith. Triangular reinforcing gussets 33 are welded to the sleeve 30 and mounting plate 23.

A cylindrical king pin 36 is slideably mounted in the cylindrical sleeve 30 for vertical movement therein. It has a neck 37 in its upper end surmounted by a flat top flange 38 that is a rather close fit in the hole 31 through the plate 23 so that it substantially closes the top of the cylindrical sleeve and lies flush with the top of the plate 23 when it is in its lower or retracted position. The diameter of the flat top flange 38 and the lower body portion of the pin 36 is just slightly less than the inside diameter of the sleeve 30 to allow free vertical movement of the pin within the sleeve. The bottom end of the pin 36 is covered with a circular plate 40 which is larger in diameter than the pin 36 but slightly smaller than the outside diameter of the sleeve 30 thus defining an annular shoulder 42. The lower edge of the plate 40 is slightly rounded as at 43.

On opposite sides of the lower portion of the sleeve 30 there are two depending rails or straps 45 that are attached together at their lower end by a bolt and sleeve spacer arrangement 47. Another pair of parallel rails 50 are secured at the lower ends of the rails 45 by means of the bolt and sleeve assembly 47 and extend generally outwardly and upwardly therefrom. The outer ends of the rails 50 are connected by a bolt and sleeve spacer arrangement 52. A torsion spring 55 surrounds the spacer sleeve 52 and is appropriately secured thereto with a spring arm 57 engaging the underneath surface of the plate 40, such that the action of the spring 55 with its spring arm 57 tends to urge the king pin 36 upwardly to its operative position as shown in FIG. 1 with the plate 40 engaging the bottom of the sleeve 30.

On the opposite side of the sleeve 30 from the torsion spring 55, a pair of spaced parallel plates or tabs 60 are secured such as by welding to the sleeve 30. A lock and release cam member 62, shaped generally as shown, is pivotally mounted at its upper right-hand corner as viewed in FIGS. 1, 3, and 4 between the tabs 60 by means of a bolt 64 extending through aligned apertures in the tabs 60 and cam 62 and held in place by a washer 65 and cotter pin 66. The cam member 62 has a follower surface 67 at its edge facing the torsion spring 55, and is formed at its lower end in a finger portion 70 having a notch 71 and a follower surface 72. The cam member 62 is preferably made of metal and case hardened in the area of the finger and notch. The cam member 62 is held rather loosely at its pivot so as to hang freely generally in the position shown in FIGS. 1 and 3 under its own weight.

OPERATION:

From the foregoing, operation of the king pin assembly is evident. The king pin 36 is held in its operative position as shown in FIG. 1 under the spring biasing influence of the torsion spring 55. To place the king pin assembly in its retracted position, the king pin 36 is depressed, such as by stepping on its top, until the shoulder 42 of the plate 40 engages the notch 71 of the cam member 62 as shown in FIG. 3. As the pin 36 is depressed, the cam 62 swings outwardly by engagement between the plate 40 and follower surface 67 until the shoulder 42 is adjacent the notch, at which time the cam member 62 swings back to engage the shoulder and hold the pin in its retracted position. The location of the notch 71 is such that it engages the shoulder 42 with the top of the pin 36 substantially flush with the top of the plate 23.

To release the assembly from its retracted position and thereby place it in its operative position, the pin 36 is quickly depressed and released with an impulsive action. By this action, the lower edge of the plate 40, which is slightly rounded, rides along the follower surface 72 of the finger 70 to momentarily pivot the cam member 62 outwardly to a sufficient extent such that a quick release of the pin allows the shoulder 42 to pass by the notch 71 before the cam member is allowed to swing back under its own weight. The pin 36 will then move to its operative position and be held there under the force of the spring 55.

Hence, there has been described a novel king pin assembly which can be placed in its operative and retracted positions quickly and easily and without the use of special tools, which when in its retracted position provides minimal discontinuity with the bed of the towing vehicle, and which otherwise fulfills the objects of this invention.

Various changes and modifications may be made in this invention, as will be readily apparent to those skilled in the art. Such changes and modifications are within the scope and teaching of this invention as defined by the claims appended hereto.

What is claimed is:

1. A king pin assembly for mounting to a bed of a towing vehicle comprising a pin, means for mounting the pin for movement normal to the bed between an operative position with a portion of the pin extending above the bed and a retracted position with the pin depressed, spring means for biasing the pin in its oerative position, quick release locking means for releasably locking the pin in its retracted position, and means for operating the quick release locking means from the upper side of the vehicle bed for releasing the pin from its retracted position to its operative position.

2. The king pin assembly of claim 1 wherein the quick release locking means further comprises means responsive to a depression of the pin in its retracted position for releasing the pin from that position to the operative position.

3. The king pin assembly of claim 1 wherein the mounting means includes a mounting plate having a hole through which the pin extends, the top of the pin fitting flush with the top of the mounting plate with the pin it its retracted position.

4. The king pin assembly of claim 3 wherein the mounting means further comprises a sleeve mounted beneath the mounting plate in axial alignment with the hole, the pin being mounted for axial movement within the sleeve.

5. A king pin assembly for mounting to a bed of a towing vehicle comprising a pin, means for mounting the pin for movement normal to the bed between an operative position with a portion of the pin extending above the bed and a retracted position with the pin depressed, spring means for biasing the pin in its operative position, and quick release locking means for releasably locking the pin in its retracted position, said quick release locking means including a cam member having an engaging surface for engaging a portion of the pin when in its retracted position to lock the pin in that position, the cam member being operable in response to movement of the pin from its operative position to lock the pin in the retracted position, and operable in response to a depression of the pin from its retracted position to disengage the engaging surfaces from the pin.

6. The king pin assembly of claim 5 wherein the pin has a projecting member and wherein the cam member further has a first follower surface, said assembly further comprising means for mounting said cam member for engagement of its first follower surface with said projecting member and for movement of said cam member outwardly in response to such engagement upon depression of the pin from its operative to its retracted position.

7. The king pin assembly of claim 6 wherein the cam member has a second follower surface positioned to engage the projecting member upon depression of the pin from its retracted position to move the cam member outwardly to disengage the engaging surface and the pin.

8. The king pin assembly of claim 7 wherein the cam member is eccentrically mounted near its top for pivotal movement outwardly and against its weight by the projecting member in response to depression of the pin.

9. A king pin assembly for mounting to a bed of a towing vehicle comprising a pin, means for mounting the pin for movement normal to the bed between an operative position with a portion of the pin extending above the bed and a retracted position with the pin depressed, spring means for biasing the pin in its operative position, and quick release locking means for releasably locking the pin in its retracted position, which quick release locking means further includes means responsive to an impulsive depression and release of the pin in its retracted position for releasing the pin from that position to the operative position.

10. The king pin assembly of claim 9 further comprising a cam member, and means for mounting said cam member for movement in response to depression of the pin from its retracted position to release the locking means.

11. The king pin assembly of claim 10 wherein the cam member includes an engaging surface for engaging a portion of the pin when in its retracted position to lock the pin in that position, the cam member being operable in response to movement of the pin from its operative position to lock the pin in the retracted position.

12. A king pin assembly for mounting to the bed of a towing vehicle comprising a pin, means for mounting the pin for movement normal to the bed between an operative position with a portion of the pin extending above the bed and a retracted position with the pin depressed, spring means for biasing the pin in its operative position, and quick release locking means for releasably locking the pin in its retracted position including means responsive to a depression of the pin in its retracted position for releasing the pin from that position to the operative position.

* * * * *